US006630118B2

(12) United States Patent
Paparatto et al.

(10) Patent No.: US 6,630,118 B2
(45) Date of Patent: Oct. 7, 2003

(54) PROCESS FOR THE DIRECT SYNTHESIS OF HYDROGEN PEROXIDE

(75) Inventors: Giuseppe Paparatto, Cinisello Balsamo (IT); Rino D'Aloisio, Novara (IT); Giordano De Alberti, Besnate (IT); Roberto Buzzoni, San Mauro Torinese (IT)

(73) Assignees: Eni S.p.A., Rome (IT); Enichem S.p.A., San Donato Milanese (IT)

( * ) Notice: Subject to any disclaimer, the term of this patent is extended or adjusted under 35 U.S.C. 154(b) by 63 days.

(21) Appl. No.: 09/870,826

(22) Filed: Jun. 1, 2001

(65) Prior Publication Data

US 2002/0028174 A1 Mar. 7, 2002

(30) Foreign Application Priority Data

Jun. 1, 2000 (IT) ..................... MI2000A1219

(51) Int. Cl.$^7$ ........................................... C01B 15/026
(52) U.S. Cl. ..................................................... 423/584
(58) Field of Search ........................... 423/584; 502/339

(56) References Cited

U.S. PATENT DOCUMENTS

| 4,250,962 | A | * | 2/1981 | Madgavkar et al. | ........ 166/256 |
|---|---|---|---|---|---|
| 4,295,957 | A | | 10/1981 | Mauldin et al. | ............. 208/138 |
| 4,379,778 | A | | 4/1983 | Dalton, Jr. et al. | ......... 423/584 |
| 5,104,635 | A | * | 4/1992 | Kanada et al. | .............. 423/584 |
| 5,447,896 | A | | 9/1995 | Rao | ........................... 502/184 |
| 5,925,588 | A | | 7/1999 | Chuang et al. | ............. 502/181 |
| 6,284,213 | B1 | | 9/2001 | Paparatto et al. | ........... 423/403 |

FOREIGN PATENT DOCUMENTS

| EP | 0 537 836 | 4/1993 |
|---|---|---|
| EP | 0 978 316 | 2/2000 |
| WO | WO 92/15520 | 9/1992 |
| WO | WO 98/16463 | 4/1998 |

* cited by examiner

Primary Examiner—Stanley S. Silverman
Assistant Examiner—Maribel Medina
(74) Attorney, Agent, or Firm—Oblon, Spivak, McClelland, Maier & Neustadt, P.C.

(57) ABSTRACT

A bimetallic catalyst is obtained by dispersing, in sequence and alternating, the precursors of the single metal components of the catalyst on a carrier. A process for the synthesis of hydrogen peroxide by the direct reaction of hydrogen with oxygen, in a solvent medium containing a halogenated promoter and an acid promoter, in the presence of the bimetallic catalyst.

12 Claims, No Drawings

PROCESS FOR THE DIRECT SYNTHESIS OF HYDROGEN PEROXIDE

The present invention relates to a bimetallic catalyst and a process for the direct synthesis of hydrogen peroxide from hydrogen and oxygen which uses said catalyst.

Hydrogen peroxide is a commercially important compound which is widely used as bleach in the textile and paper industry, as a biocide in the environmental field and in oxidation processes in the chemical industry.

Examples of these processes are those using titanium silicalite as catalysts, such as the epoxidation of olefins (EP-100,119), the ammoximation of carbonyl compounds (U.S. Pat. No. 4,794,198), the oxidation of ammonia to hydroxylamine (U.S. Pat. No. 5,320,819) and the hydroxylation of aromatic hydrocarbons (U.S. Pat. No. 4,369,783).

The industrial production of aqueous solutions of $H_2O_2$ by means of a complex two-step process, is known. In this process a solution of an anthraquinone, such as butylanthraquinone or ethylanthraquinone, in an organic medium immiscible with water is first hydrogenated and then oxidized with air to produce $H_2O_2$ which is subsequently extracted in aqueous phase.

This procedure is expensive owing to the high investment costs necessary for the complex production unit involved and the necessity of separating and disposing of the by-products generated during the oxidation phase and purifying and reintegrating the anthraquinone solution before being re-used.

Processes for the direct synthesis of hydrogen peroxide from $H_2$ and $O_2$ have been proposed in the art for overcoming these disadvantages. These processes generally use a catalytic system consisting of a noble metal, particularly metals of the platinum group or their mixtures, in the form of salts or as supported metals.

For example, U.S. Pat. Nos. 4,772,458 and 4,832,938 describe a process for the synthesis of aqueous solutions of $H_2O_2$ using a catalyst based on palladium and/or platinum supported on carbon, in the presence of hydrogen ions and bromide ions. Quantities of acids ranging from 2.5 to 10 g/liter are generally required for obtaining high concentrations of $H_2O_2$.

The use of high quantities of acids creates serious problems linked to the dissolution of the active phase (metal) of the catalyst in the reaction medium, with the consequent instability of both the catalyst and hydrogen peroxide solution produced.

In addition, under these conditions, the solutions of $H_2O_2$ produced are difficult to use owing to the high acid content. These processes also operate under critical conditions as concentrations of $H_2$ higher than 5% (17% or over) are used with respect to the reaction mixture and consequently fall within the explosivity limit of $H_2/O_2$ mixtures.

Patent application EP-492.064 describes a process for the synthesis of hydrogen peroxide from hydrogen and oxygen which uses a catalyst based on palladium supported on a halogenated resin, in particular a brominated styrene/divinylbenzene resin.

The reaction is carried out in water, in the presence of an acid selected from sulfuric, phosphoric or nitric acid. Operating according to this process however concentrations of $H_2O_2$ of about 0.58% are obtained.

Patent application EP-504,741 describes a process for the synthesis of $H_2O_2$ from hydrogen and oxygen which uses a catalyst based on palladium or platinum supported on an acid or superacid carrier selected from oxides of molybdenum, zirconium or tungsten.

Operating according to this process, hydrogen peroxide is obtained in concentrations of not more than 1%.

U.S. Pat. No. 5,320,921 describes a process for the synthesis of $H_2O_2$ from hydrogen and oxygen which uses a catalyst based on palladium or platinum supported on a heteropolyacid made insoluble in water. The reaction is carried out in water in the presence of bromide ions (0.5 mmoles/liter of sodium bromide). Concentrations of $H_2O_2$ equal to about 1.1% are obtained.

These processes of the known art are consequently characterized by a low productivity and selectivity of the reaction and by the production of $H_2O_2$ solutions which are too dilute for an economic industrial exploitation.

Italian patent application MI 98-A-01843, filed by the Applicant, relates to a process for the direct synthesis of hydrogen peroxide using a catalyst based on palladium and/or platinum co-impregnated on a sulfonated activated carbon.

It has now been found that by carrying out the reaction between hydrogen and oxygen in the presence of a bimetallic catalyst prepared by dispersing in sequence and alternating the precursors of the single metal components of the catalyst on a carrier, it is possible to overcome the drawbacks of the known art described above. This preparation method also allows the activity and selectivity of the catalyst, the concentration of hydrogen peroxide or consumption of hydrogen, to be modulated in relation to the process requirements and availability of raw materials, for example low cost hydrogen.

In particular, the use of these catalysts gives the following advantages:

(i) the possibility of using extremely low quantities of halides ($<10^{-4}$ moles/l) and free acids ($H^+ < 10^{-2}$ moles/l) in the reaction medium. This has beneficial effects on the stability of the catalytic system and $H_2O_2$ solutions obtained, thus allowing the possibility of directly using the above solutions in oxidation processes. The presence of only traces of halides and acidity is not a disadvantage for direct use in the above reactions as the possible introduction of salts or acidity in downstream processes is minimized.

(ii) the production of hydrogen peroxide solutions in adequate concentrations for direct use and economically valid in oxidation processes, generally ranging from 2% to 10% by weight.

(iii) the possibility of carrying out the reaction under high safety conditions. In fact, below 4% by volume of hydrogen means operating well outside the explosivity range of inert $H_2$—$O_2$ mixtures.

In accordance with this, the present invention relates to a bimetallic catalyst obtained by dispersing in sequence and alternating the precursors of the single metal components of the catalyst on a carrier, and a process for the synthesis of hydrogen peroxide by the direct reaction of hydrogen with oxygen, in a solvent medium containing a halogenated promoter and an acid promoter, in the presence of said catalyst.

In particular, the catalyst used for the purposes of the present invention is obtained by:

(a) preparation of the solutions or suspensions of precursors of the single metal components of the catalytic system;
(b) dispersion of the solutions or suspensions obtained in (a) in sequence on a carrier;
(c) treatment of the catalyst with a reducing agent of the metal and drying at 120–140° C. between one dispersion and another.

In the preparation of said catalyst, steps (b) and (c) can be repeated once or several times.

The metal components of the catalyst are selected from those of the platinum group. Palladium and platinum are preferably used.

In these catalysts the palladium is normally present in a quantity ranging from 0.01 to 5% by weight and the platinum in a quantity ranging from 0.01 to 1% by weight, with an atomic ratio between platinum and palladium ranging from 0.1/99.9 to 50/50.

The palladium is preferably present in a quantity ranging from 0.4 to 2% by weight and the platinum in a quantity ranging from 0.05 to 0.5% by weight, with an atomic ratio between platinum and palladium ranging from 1/99 to 30/70.

The dispersion of the active components on the carrier can be effected by means of precipitation, impregnation or adsorption starting from solutions of their salts or soluble complexes selected from acetates, halides and nitrates.

The reduction of the catalyst components to the metal state can be carried out by means of thermal and/or chemical treatment with reducing substances such as hydrogen, sodium formate, sodium citrate, using preparative methods well known in the art.

The inert carrier can consist of activated carbon, silica, alumina, silica-alumina, zeolites and other materials well known in the art. Activated carbon is preferred for the preparation of the catalysts useful for the invention.

Activated carbons which can be used for the purposes of the invention are those with a low ash content and a surface area of at least 100 $m^2/g$, in particular those having a surface area greater than 300 $m^2/g$.

Sulfonated activated carbons described in Italian patent application MI 98-A-01843 can also be used for the purpose.

The carriers can be in powder, grain or pellet form, etc.

Before supporting the precursors of the single metals, the activated carbon can be subjected to treatment such as washing with distilled water or treatment with acids, bases or diluted oxidizing agents, for example acetic acid, hydrochloric acid, sodium carbonate and hydrogen peroxide.

In particular, it has been observed that the catalyst obtained by dispersing first the palladium and then the platinum on the carrier, is more active, whereas that obtained by dispersing first the platinum and then the palladium in sequence, is more selective.

The catalyst of the present invention is particularly advantageous in a process for the direct synthesis of hydrogen peroxide from hydrogen and oxygen in a solvent in the presence of a halogenated promoter and an acid promoter.

The catalyst is used in catalytic quantities generally ranging from $10^{-6}$ to $10^{-2}$ moles of total metal contained in the catalyst per liter of reaction medium.

Advantageous results are obtained using quantities of catalyst ranging from $10^{-4}$ to $10^{-3}$ moles of total metal contained in the catalyst per liter of reaction medium.

The reaction solvent can consist of water, a $C_1$–$C_3$ alcohol or their mixtures.

Among $C_1$–$C_3$ alcohols, methanol is preferred for the purposes of the invention. Among the mixtures, a mixture of methanol and water with a weight ratio ranging from 50/50 to 99.9/0.1, preferably from 90/10 to 99/1, is preferred.

The acid promoter can be any substance capable of generating $H^+$ hydrogen ions in the liquid reaction medium and is generally selected from inorganic acids such as sulfuric, phosphoric, nitric acids or from organic acids such as sulfonic acids. Sulfuric acid and phosphoric acid are preferred. The concentration of the acid generally ranges from 20 to 1000 mg per kg of solution and preferably from 50 to 500 mg per kg of solution.

The halogenated promoter can be any substance capable of generating halogen ions in the liquid reaction medium. Substances capable of generating bromide ions are preferred. These substances are generally selected from hydrobromic acid and its salts soluble in the reaction medium, for example sodium bromide, potassium bromide, sodium or ammonium bromate. Hydrobromic acid, sodium bromide and potassium bromide are particularly preferred.

The concentration of halogenated promoter generally ranges from 0.1 to 50 mg per kg of solution and preferably from 1 to 10 mg per kg of solution.

The production of hydrogen peroxide is carried out by reacting the oxygen and hydrogen in the reaction medium in the presence of the catalyst and promoters and in the presence of or without an inert gas selected from nitrogen, helium, argon. The gas is preferably nitrogen.

The molar ratio $H_2/O_2$ in the feeding ranges from ½ to 1/100, preferably from ⅓ to 1/15 and the concentration of hydrogen in the gaseous phase in contact with the liquid reaction medium is conveniently maintained at a value lower than 4.5% molar, outside the explosivity limits of the $H_2/O_2$/inert gas mixture.

According to an embodiment of the process of the present invention, the reaction can be carried out using air instead of pure oxygen.

The reaction is typically carried out at temperatures ranging from –5° to 90° C., preferably from 2 to 50° C. and at a total pressure higher than atmospheric pressure, preferably ranging from 50 to 300 atmospheres.

The process according to the present invention can be carried out batchwise, or, preferably, in continuous using a reactor suitable for the purpose and selected from those described in the art.

Operating under the above conditions, it is possible to produce hydrogen peroxide in safety conditions with a reaction productivity normally ranging from 30 to 200 g of $H_2O_2$ (expressed as 100% $H_2O_2$) per liter of reaction medium per hour and with a molar selectivity towards the formation of $H_2O_2$, referring to the hydrogen used up, ranging from 60% to 90%. The hydrogen peroxide solutions thus obtained can be used directly in oxidation processes which comprise the use of $H_2O_2$ without costly intermediate processing, such as acid and solvent removal operations.

The process of the present invention enables the reagents to be transformed into $H_2O_2$ with high conversions and selectivities, obtaining $H_2O_2$ solutions without acidity or containing only traces of acidity and/or salts.

The following examples, whose sole purpose is to describe the present invention in greater detail, should in no way be considered as limiting its scope.

EXAMPLE 1

Preparation of the Catalyst a) 8 g of activated maritime pine charcoal in powder form (Ceca 2S/E) are charged into a 0.5 liter glass flask, containing 90 ml of demineralized water and 0.28 g of $Na_2CO_3$. The suspension is maintained at room temperature (20–25° C.), under stirring, for 10 minutes.

0.101 g of a solution of $H_2PtCl_6$ (8% by weight of Pt) diluted in 10 ml of water are subsequently added dropwise.

The suspension is kept at room temperature for 10 minutes and is then heated in a water bath for 10 minutes to 90° C. A solution containing 0.76 g of sodium formate in 10 ml of water is then added and the stirring is continued at 90° C. for 2 hours.

After cooling to room temperature, the suspension is filtered and the recovered charcoal is washed with distilled water until the chlorides have been eliminated and dried in an oven at 120° C. for 2 hours.

b) the carbon thus obtained is re-suspended in a solution containing 0.4 g of $Na_2CO_3$ in 90 ml of water and then treated following the procedure described in a), but using a solution of 0.8 g of $Na_2PdCl_4$ at 10% of Pd, instead of the solution of $H_2PtCl_6$.

After drying at 120° C., a catalyst containing 1% of Pd and 0.1% of Pt on activated carbon is obtained.

EXAMPLE 2

The same procedure is adopted as described in example 1, but inverting the sequence of Pt—Pd deposit.

In step a) the solution $Na_2PdCl_4$ is used, and in step b) the solution of $H_2PtCl_6$, maintaining the same quantities. A catalyst containing 0.1% of Pt and 1% of Pd on activated carbon, is obtained.

EXAMPLE 3

Comparative

Preparation of a Co-Impregnated Catalyst 8 g of activated maritime pine charcoal in powder form (Ceca 2S/E) are charged into a 0.5 liter glass flask, containing 90 ml of demineralized water and 0.28 g of $Na_2CO_3$. The suspension is maintained at room temperature (20–25° C.), under stirring, for 10 minutes.

0.101 g of a solution of $H_2PtCl_6$ (8% by weight of Pt) and 0.80 g of $Na_2PdCl_4$ (10% Pd) diluted in 10 ml of water, are subsequently added dropwise, under stirring.

The suspension is kept at room temperature for 10 minutes and is then heated in a water bath for 10 minutes to 90° C. A solution containing 760 mg of sodium formiate in 10 ml of water is then added and the stirring is continued at 90° C. for 2 hours.

After cooling to room temperature, the suspension is filtered and the recovered charcoal is washed with distilled water until the chlorides have been eliminated and dried in an oven at 120° C. for 2 hours.

The end catalyst contains 1% of Pd and 0.1% of Pt, the active phase was obtained by co-impregnation of Pd and Pt.

EXAMPLE 4

Comparative

The same procedure is adopted as described in example 3, but using only the Pd salt in the preparation.

A catalyst is obtained, containing 1% of Pd on activated carbon.

EXAMPLE 5

Comparative

The same procedure is adopted as described in example 3, but using only the Pt salt in the preparation.

A catalyst is obtained, containing 0.1% of Pt on activated carbon.

EXAMPLE 6

Synthesis of $H_2O_2$

A micropilot plant is used, consisting of a Hastelloy C autoclave equipped with a thermostat-regulation system, magnetic drag stirring, a regulation and control system of the pressure during the reaction, a filter for continuously removing the liquid phase containing the reaction products, a feeding system of the solvent mixture in which the reaction takes place and a series of instruments for the regulation and control of the gaseous feeds. The reaction trend is followed by continuously analyzing the hydrogen and oxygen in the feeding and at the outlet of the reactor.

The selectivity with respect to the converted hydrogen is calculated on the basis of the concentration of $H_2O_2$ in the reaction effluent and on the basis of analysis of the $H_2$ leaving the reactor. The concentration of $H_2O_2$ which is formed is determined by titration with potassium permanganate.

0.6 g of catalyst prepared as described in example 1 and 200 g of methanol:water solution (95/5 by weight) containing 6 ppm of HBr and 300 ppm of $H_2SO_4$ are charged into the reactor.

The autoclave is pressurized, without stirring, at 100 bars with a gaseous mixture consisting of 3.6% of $H_2$, 10% of $O_2$ and 86.4% of $N_2$. The stirring is then started up to 800 revs/minute, the pressure is maintained with a continuous stream, 700 normal liters (Nl), of the same gaseous mixture, and 300 g/hour of a methanol:water solution having the composition defined above, is fed at the same time. The temperature inside the reactor is kept at 6° C. The results are indicated in Table 1.

TABLE 1

| Hrs of reaction | $H_2O_2$ wt % | Molar selectivity $H_2O_2$ % |
|---|---|---|
| 5 | 4.7 | 83 |
| 10 | 4.6 | 84 |
| 20 | 4.6 | 84 |
| 50 | 4.5 | 86 |

EXAMPLE 7

Example 6 is repeated using the catalyst prepared in example 2.

The results obtained are indicated in Table 2.

TABLE 2

| Hrs of reaction | $H_2O_2$ wt % | Molar selectivity $H_2O_2$ % |
|---|---|---|
| 5 | 6.5 | 70 |
| 10 | 6.6 | 71 |
| 20 | 6.4 | 71 |
| 50 | 6.6 | 72 |

EXAMPLE 8

Example 6 is repeated using a catalyst prepared as in example 2, but using a sulfonated carbon as carrier, prepared as described in example 1 of Italian patent MI 98-A-01843.

The results are indicated in Table 3.

TABLE 3

| Hrs of reaction | $H_2O_2$ wt % | Molar selectivity $H_2O_2$ % |
|---|---|---|
| 5 | 6.2 | 73 |
| 10 | 6.4 | 74 |
| 20 | 6.5 | 73 |

TABLE 3-continued

| Hrs of reaction | $H_2O_2$ wt % | Molar selectivity $H_2O_2$ % |
|---|---|---|
| 30 | 6.3 | 75 |
| 50 | 6.6 | 76 |
| 100 | 6.5 | 75 |

EXAMPLE 9

Comparative

Example 6 is repeated using the catalyst prepared in example 3. The results obtained are indicated in Table 4.

TABLE 4

| Hrs of reaction | $H_2O_2$ wt % | Molar selectivity $H_2O_2$ % |
|---|---|---|
| 5 | 4.8 | 75 |
| 10 | 4.9 | 76 |
| 20 | 4.7 | 77 |
| 50 | 4.6 | 77 |

EXAMPLE 10

Comparative

Example 6 is repeated using the catalyst prepared in example 4.
The results obtained are indicated in Table 5.

TABLE 5

| Hrs of reaction | $H_2O_2$ wt % | Molar selectivity $H_2O_2$ % |
|---|---|---|
| 5 | 0.9 | 35 |
| 10 | 0.8 | 37 |

EXAMPLE 11

Comparative

Example 6 is repeated using the catalyst prepared in example 5.
The results obtained are indicated in Table 6.

TABLE 6

| Hrs of reaction | $H_2O_2$ wt % | Molar selectivity $H_2O_2$ % |
|---|---|---|
| 5 | 1.7 | 22 |
| 10 | 1.5 | 25 |

What is claimed is:

1. A process comprising
   directly reacting hydrogen with oxygen to form hydrogen peroxide in a solvent medium containing a halogenated promoter and an acid promoter, in the presence of a bimetallic catalyst comprising at least two single metal components obtained by dispersing in sequence and alternating the single metal components of the catalyst on a carrier,
   wherein the carrier is an activated carbon with a low ash content and a surface area of at least 100 $m^2/g$.

2. The process according to claim 1, wherein the activated carbon has a surface area higher than 300 $m^2/g$.

3. A process comprising
   directly reacting hydrogen with oxygen to form hydrogen peroxide in a solvent medium containing a halogenated promoter and an acid promoter, in the presence of a bimetallic catalyst comprising at least two single metal components obtained by dispersing in sequence and alternating the single metal components of the catalyst on a carrier,
   wherein the solvent medium is methanol.

4. A process comprising
   directly reacting hydrogen with oxygen to form hydrogen peroxide in a solvent medium containing a halogenated promoter and an acid promoter in the presence of a bimetallic catalyst comprising at least two single metal components obtained by dispersing in sequence and alternating the single metal components of the catalyst on a carrier,
   wherein the solvent medium is a mixture of alcohol:water with a weight ratio between the two ranging from 50:50 to 99.9:0.1.

5. The process according to claim 4, wherein the weight ratio alcohol:water ranges from 90:10 to 99:1.

6. A process comprising
   directly reacting hydrogen with oxygen to form hydrogen peroxide in a solvent medium containing a halogenated promoter and an acid promoter, in the presence of a bimetallic catalyst comprising at least two single metal components obtained by dispersing in sequence and alternating the single metal components of the catalyst on a carrier,
   wherein the concentration of halogenated promoter ranges from 0.1 to 50 mg per kg of solution.

7. The process according to claim 6, wherein the concentration of halogenated promoter ranges from 1 to 10 mg per kg of solution.

8. A process comprising
   directly reacting hydrogen with oxygen to form hydrogen peroxide in a solvent medium containing a halogenated promoter and an acid promoter, in the presence of a bimetallic catalyst comprising at least two single metal components obtained by dispersing in sequence and alternating the single metal components of the catalyst on a carrier,
   wherein the concentration of the acid promoter ranges from 20 to 1000 mg per kg of solution.

9. The process according to claim 8, wherein the concentration of the acid promoter ranges from 50 to 500 mg per kg of solution.

10. A process comprising
    directly reacting hydrogen with oxygen to form hydrogen peroxide in a solvent medium containing a halogenated promoter and an acid promoter, in the presence of a bimetallic catalyst comprising at least two single metal components obtained by dispersing in sequence and alternating the single metal components of the catalyst on a carrier,
    wherein the catalyst is used in quantities ranging from $10^{-6}$ to $10^{-2}$ moles of total metal contained in the catalyst per liter of solvent medium.

11. The process according to claim 10, wherein the catalyst is used in quantities ranging from $10^{-4}$ to $10^{-3}$ moles of total metal contained in the catalyst per liter of the solvent medium.

12. A process comprising directly reacting hydrogen with oxygen to form hydrogen peroxide in a solvent medium containing a halogenated promoter and an acid promoter, in the presence of a bimetallic catalyst comprising at least two single metal components obtained by dispersing in sequence and alternating the single metal components of the catalyst on a carrier, wherein the concentration of hydrogen in a gaseous phase in contact with the solvent medium is maintained at a value lower than 4.5% molar.

* * * * *